(12) United States Patent
Destain et al.

(10) Patent No.: US 8,070,295 B2
(45) Date of Patent: *Dec. 6, 2011

(54) OPTICAL PROJECTION SUBSYSTEM

(75) Inventors: Patrick R. Destain, Allen, TX (US);
Jennifer L. Grace, Lakeside Park, KY (US); John E. Duncan, Amelia, OH (US); Tomasz A. Pol, Cincinnati, OH (US); William E. Phillips, III, Cincinnati, OH (US); Michael W. O'Keefe, Cincinnati, OH (US); Alexander Glinski, Cincinnati, OH (US); Stephen J. Willett, Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/006,079

(22) Filed: Jan. 13, 2011

(65) Prior Publication Data
US 2011/0122371 A1 May 26, 2011

Related U.S. Application Data

(63) Continuation of application No. 11/831,307, filed on Jul. 31, 2007, now Pat. No. 7,901,083, which is a continuation of application No. 11/772,609, filed on Jul. 2, 2007.

(60) Provisional application No. 60/820,894, filed on Jul. 31, 2006, provisional application No. 60/820,887, filed on Jul. 31, 2006, provisional application No. 60/820,888, filed on Jul. 31, 2006, provisional application No. 60/820,883, filed on Jul. 31, 2006, provisional application No. 60/821,032, filed on Aug. 1, 2006, provisional application No. 60/838,988, filed on Aug. 21, 2006.

(51) Int. Cl.
*G02B 21/36* (2006.01)
*G02F 1/1335* (2006.01)

(52) U.S. Cl. ............................................. 353/39; 349/5
(58) Field of Classification Search .................... 353/39, 353/122, 85, 30, 31; 349/5, 7
See application file for complete search history.

(56) References Cited

U.S. PATENT DOCUMENTS

| | | |
|---|---|---|
| 5,022,750 A | 6/1991 | Flasck |
| 5,084,807 A | 1/1992 | McKechnie et al. |
| 5,108,172 A | 4/1992 | Flasck |
| 5,335,158 A | 8/1994 | Kaplan et al. |
| 5,349,509 A | 9/1994 | Klug |

(Continued)

FOREIGN PATENT DOCUMENTS
AU 2005/200510 2/2005
(Continued)

OTHER PUBLICATIONS

U.S. Appl. No. 60/820,894, filed Jul. 31, 2006.
(Continued)

*Primary Examiner* — William C Dowling
*Assistant Examiner* — Ryan Howard
(74) *Attorney, Agent, or Firm* — Kristofor L. Storvick

(57) ABSTRACT

A projection subsystem includes a light engine that provides a collection lens, a collimator and at least one solid state light emitter. A projection lens assembly receives the image and provides a projection beam having a luminous flux level. The projection subsystem has a portability efficacy.

23 Claims, 12 Drawing Sheets

U.S. PATENT DOCUMENTS

| | | | |
|---|---|---|---|
| 5,592,578 A | 1/1997 | Ruh | |
| 5,625,738 A | 4/1997 | Magarill | |
| 5,738,429 A | 4/1998 | Tagawa et al. | |
| 5,772,265 A | 6/1998 | Gilbert | |
| 5,882,774 A | 3/1999 | Jonza et al. | |
| 5,962,114 A | 10/1999 | Jonza et al. | |
| 6,050,690 A | 4/2000 | Shaffer et al. | |
| 6,091,085 A | 7/2000 | Lester | |
| 6,188,460 B1 | 2/2001 | Faris | |
| 6,200,002 B1 | 3/2001 | Marshall et al. | |
| 6,204,523 B1 | 3/2001 | Carey et al. | |
| 6,246,446 B1 | 6/2001 | Heimbuch et al. | |
| 6,260,973 B1 | 7/2001 | Minato | |
| 6,328,447 B1 | 12/2001 | Yamazaki et al. | |
| 6,337,536 B1 | 1/2002 | Matsubara et al. | |
| 6,485,147 B2 | 11/2002 | Liang | |
| 6,486,499 B1 | 11/2002 | Krames et al. | |
| 6,520,643 B1 | 2/2003 | Holman et al. | |
| 6,527,411 B1 | 3/2003 | Sayers | |
| 6,590,235 B2 | 7/2003 | Carey et al. | |
| 6,609,795 B2 | 8/2003 | Weber et al. | |
| 6,639,706 B2 | 10/2003 | Ziv | |
| 6,719,426 B2 | 4/2004 | Magarill et al. | |
| 6,721,096 B2 | 4/2004 | Brunzzone et al. | |
| 6,729,730 B2 | 5/2004 | Ito | |
| 6,772,265 B2 | 8/2004 | Baweja et al. | |
| 6,791,749 B2 | 9/2004 | DelPico et al. | |
| 6,793,344 B2 | 9/2004 | Kwok et al. | |
| 6,830,345 B2 | 12/2004 | Kamm et al. | |
| 6,856,466 B2 | 2/2005 | Tocci | |
| 6,869,206 B2 | 3/2005 | Zimmerman | |
| 6,961,190 B1 | 11/2005 | Tamaoki et al. | |
| 6,981,642 B2 | 1/2006 | Krichever | |
| 7,046,338 B2 | 5/2006 | McGuire | |
| 7,059,728 B2 | 6/2006 | Alasaarela et al. | |
| 7,072,096 B2 | 7/2006 | Holman et al. | |
| 7,101,050 B2 | 9/2006 | Magarill et al. | |
| 7,133,211 B2 | 11/2006 | Kwok | |
| 7,168,820 B1 | 1/2007 | Minassian | |
| 7,215,882 B2 | 5/2007 | Cho et al. | |
| 7,280,288 B2 | 10/2007 | Loh | |
| 7,287,861 B2 | 10/2007 | Nakayama | |
| 7,300,177 B2 | 11/2007 | Conner | |
| 7,352,124 B2 | 4/2008 | Beeson et al. | |
| 7,423,297 B2 | 9/2008 | Leatherdale | |
| 7,445,340 B2 | 11/2008 | Conner et al. | |
| 7,473,013 B2 | 1/2009 | Shimaca | |
| 7,479,662 B2 | 1/2009 | Soules | |
| 7,540,616 B2 | 6/2009 | Conner | |
| 7,717,589 B2 | 5/2010 | Nishioka | |
| 7,717,599 B2 | 5/2010 | Grace | |
| 7,901,083 B2 * | 3/2011 | Destain et al. | 353/39 |
| 2002/0024640 A1 | 2/2002 | Ioka | |
| 2002/0057057 A1 | 5/2002 | Sorg | |
| 2002/0080622 A1 | 6/2002 | Pashley et al. | |
| 2002/0125324 A1 | 9/2002 | Yavid et al. | |
| 2002/0126363 A1 | 9/2002 | Ziv | |
| 2002/0139984 A1 | 10/2002 | Sugawara et al. | |
| 2002/0176015 A1 | 11/2002 | Lichtfuss | |
| 2002/0180107 A1 | 12/2002 | Jackson et al. | |
| 2002/0180933 A1 | 12/2002 | Ito | |
| 2002/0190406 A1 | 12/2002 | Merrill et al. | |
| 2003/0048423 A1 | 3/2003 | Aastuen | |
| 2003/0117595 A1 | 6/2003 | Li | |
| 2003/0147055 A1 | 8/2003 | Yokoyama | |
| 2003/0231497 A1 | 12/2003 | Sakata et al. | |
| 2004/0099992 A1 | 5/2004 | Merrill et al. | |
| 2004/0099993 A1 | 5/2004 | Jackson et al. | |
| 2004/0140765 A1 | 7/2004 | Takekuma | |
| 2004/0150997 A1 | 8/2004 | Ouderkirk | |
| 2004/0174500 A1 | 9/2004 | Ito | |
| 2004/0196518 A1 | 10/2004 | Wine et al. | |
| 2004/0218387 A1 | 11/2004 | Gerlach | |
| 2004/0227898 A1 | 11/2004 | Ma et al. | |
| 2004/0264185 A1 | 12/2004 | Grotsch et al. | |
| 2005/0001999 A1 | 1/2005 | Eguchi | |
| 2005/0006658 A1 | 1/2005 | Ho | |
| 2005/0023545 A1 | 2/2005 | Camras et al. | |
| 2005/0036119 A1 | 2/2005 | Ruda et al. | |
| 2005/0117366 A1 | 6/2005 | Simbal | |
| 2005/0135113 A1 | 6/2005 | Wang et al. | |
| 2005/0174771 A1 | 8/2005 | Conner | |
| 2005/0179041 A1 | 8/2005 | Harbers et al. | |
| 2005/0185419 A1 | 8/2005 | Holman | |
| 2005/0206770 A1 | 9/2005 | Nathanson et al. | |
| 2005/0213057 A1 | 9/2005 | Nakayama | |
| 2005/0269587 A1 | 12/2005 | Loh et al. | |
| 2005/0269591 A1 | 12/2005 | Hsin Chen et al. | |
| 2006/0007538 A1 | 1/2006 | Robinson | |
| 2006/0012299 A1 | 1/2006 | Suehiro | |
| 2006/0022210 A1 | 2/2006 | Streubel | |
| 2006/0034082 A1 | 2/2006 | Park et al. | |
| 2006/0039140 A1 | 2/2006 | Magarill | |
| 2006/0055838 A1 | 3/2006 | Mi | |
| 2006/0066192 A1 | 3/2006 | Beeson | |
| 2006/0082560 A1 | 4/2006 | Greer et al. | |
| 2006/0083000 A1 | 4/2006 | Yoon et al. | |
| 2006/0091411 A1 | 5/2006 | Ouderkirk et al. | |
| 2006/0091784 A1 | 5/2006 | Conner et al. | |
| 2006/0091798 A1 | 5/2006 | Ouderkirk et al. | |
| 2006/0092532 A1 | 5/2006 | Ouderkirk et al. | |
| 2006/0102914 A1 | 5/2006 | Smits et al. | |
| 2006/0124918 A1 | 6/2006 | Miller et al. | |
| 2006/0139575 A1 | 6/2006 | Alasaarela et al. | |
| 2006/0139580 A1 | 6/2006 | Conner | |
| 2006/0158887 A1 | 7/2006 | Holder et al. | |
| 2006/0163590 A1 | 7/2006 | Erchak et al. | |
| 2006/0221305 A1 | 10/2006 | Magarill | |
| 2006/0232578 A1 | 10/2006 | Reinhorn | |
| 2006/0262282 A1 | 11/2006 | Magarill | |
| 2006/0262514 A1 | 11/2006 | Conner et al. | |
| 2007/0016199 A1 | 1/2007 | Boehm, Jr. et al. | |
| 2007/0023941 A1 | 2/2007 | Duncan et al. | |
| 2007/0024981 A1 | 2/2007 | Duncan et al. | |
| 2007/0030456 A1 | 2/2007 | Duncan et al. | |
| 2007/0063647 A1 | 3/2007 | Yu | |
| 2007/0085973 A1 | 4/2007 | Duncan et al. | |
| 2007/0103648 A1 | 5/2007 | Kojima | |
| 2007/0146639 A1 | 6/2007 | Conner | |
| 2007/0152231 A1 | 7/2007 | Destain | |
| 2007/0153397 A1 | 7/2007 | Destain | |
| 2007/0153402 A1 | 7/2007 | Destain | |
| 2007/0188864 A1 | 8/2007 | Duncan et al. | |
| 2007/0191506 A1 | 8/2007 | Lu et al. | |
| 2007/0296921 A1 | 12/2007 | Wang | |
| 2007/0297052 A1 | 12/2007 | Wang | |
| 2008/0013051 A1 | 1/2008 | Glinski | |
| 2008/0036972 A1 | 2/2008 | Phillips | |
| 2008/0048553 A1 | 2/2008 | Destain | |
| 2008/0049190 A1 | 2/2008 | Destain et al. | |
| 2008/0051135 A1 | 2/2008 | Destain | |
| 2008/0231780 A1 | 9/2008 | Graf et al. | |
| 2008/0231953 A1 | 9/2008 | Young | |
| 2009/0116214 A1 | 5/2009 | Phillips | |
| 2009/0128781 A1 | 5/2009 | Li | |
| 2009/0141250 A1 | 6/2009 | Destain | |
| 2009/0295265 A1 | 12/2009 | Tabuchi | |
| 2009/0310042 A1 | 12/2009 | Vidal et al. | |

FOREIGN PATENT DOCUMENTS

| | | |
|---|---|---|
| EP | 0 557 776 | 9/1993 |
| EP | 0 763 763 | 3/1997 |
| EP | 1 363 335 | 11/2003 |
| EP | 1 387 211 | 2/2004 |
| EP | 1 389 018 | 2/2004 |
| EP | 1 526 585 | 4/2005 |
| GB | 2 383 428 | 6/2003 |
| GB | 2 413 858 | 11/2005 |
| JP | 2003-044839 | 2/2003 |
| JP | 2006/067469 | 3/2007 |
| KR | 2005/065919 | 6/2005 |
| WO | WO 00/65664 | 11/2000 |
| WO | WO 02/102087 | 12/2002 |
| WO | WO 03/098916 | 11/2003 |
| WO | WO 2004/068602 | 8/2004 |
| WO | WO 2004/084534 | 9/2004 |
| WO | WO 2005/077002 | 8/2005 |

| | | |
|---|---|---|
| WO | WO 2005/078496 | 8/2005 |
| WO | WO 2005/083804 | 9/2005 |
| WO | WO 2005/107420 | 11/2005 |
| WO | WO 2005/119707 | 12/2005 |
| WO | WO 2006/033032 | 3/2006 |
| WO | WO 2006/033245 | 3/2006 |
| WO | WO 2006/036627 | 4/2006 |
| WO | WO 2006/061763 | 6/2006 |
| WO | WO 2006/124993 | 11/2006 |
| WO | WO 2007/016199 | 2/2007 |
| WO | WO 2007/042711 | 4/2007 |

OTHER PUBLICATIONS

U.S. Appl. No. 60/820,877, filed Jul. 31, 2006.
U.S. Appl. No. 60/820,883, filed Jul. 31, 2006.
U.S. Appl. No. 60/820,887, filed Jul. 31, 2006.
U.S. Appl. No. 60/820,888, filed Jul. 31, 2006.
U.S. Appl. No. 60/821,032, filed Aug. 1, 2006.
U.S. Appl. No. 60/838,988, filed Aug. 21, 2006.
Data Management White Papers, silicon.com, http://whitepapers.silicon.com/0,39024759,60243129p-39000676q,00.htm, downloaded Jul. 13, 2007.
Destain, Patrick; Opcon Associates Inc., Description of the Mini-projection Optical design, Jan. 23, 2006.
DigiTimes daliy IT news, TI shows projection image for mobile phone, http://www.digitimes.com/NewsShow/MailHome.asp?datePublish=2007/3/27&pages=VL&seq=207, Mar. 28, 2007.
Zou, Hans et al.; 58.1: Single-Panel LCOS Color Projector with LED Light Sources, SID 05 Digest, pp. 1698-1701, 2005.
Lo, H. et al.; P-208: Novel Optical Design for Mini-Projector, SID 06 Digest, pp. 1012-1014, 2006.
"TI Pushing DLP into Mobile Phase" http://www.dailytech.com/article.aspx?newsid=5671.
"Digismart Miniature Projection Technology" http://www.digislide.com.au/consumer/digismart.htm.
Hüseyin, Cuypers, De Smett: "Design of new collection systems for multi-LED light engines", Proceedings of SPIE, vol. 6196, No. 619604, Apr. 21, 2006, pp. 1-11 and 3-6.
Riehemann, Kühmstedt, Lippmann, Palme, Notni: "Ultrahompakte Projektionsköpfe für die optische Messtechnik auf der Basis von OLED-Displays", Proceedings 105. DGAO Jahrestagung, Jun. 5, 2004.
Hoelen, C. et al., "Multi-chip color variable LED spot modules", Proceedings of SPIE, Bellingham, WA, vol. 5941, pp. 59410A-1 to 59410A-12, Aug. 2, 2005.
Search Report for PCT Application No. PCT/US2007/074825, 3 pages, Date of Completion Nov. 28, 2007.
Written Opinion for PCT Application No. PCT/US2007/074825, 7 pages, Date of Mailing Dec. 19, 2007.

* cited by examiner

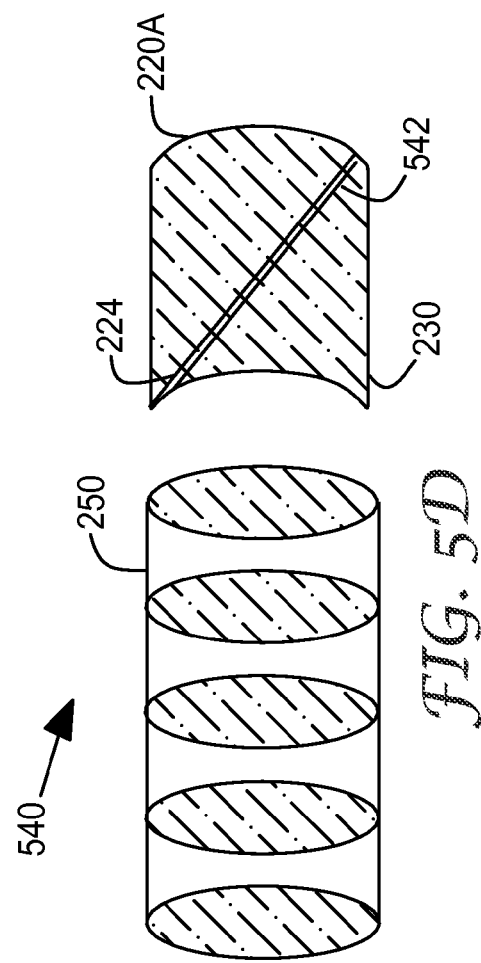
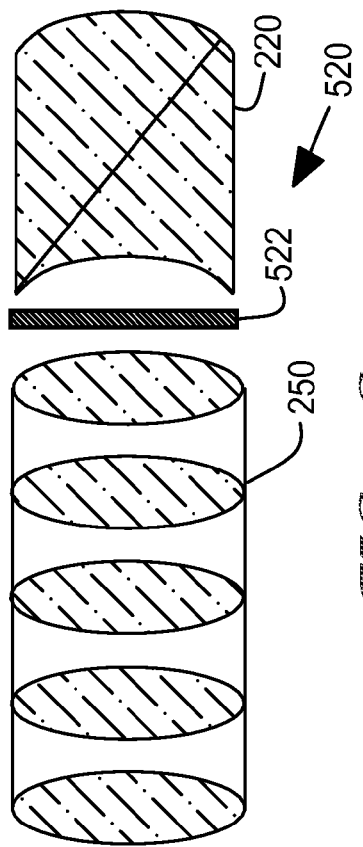
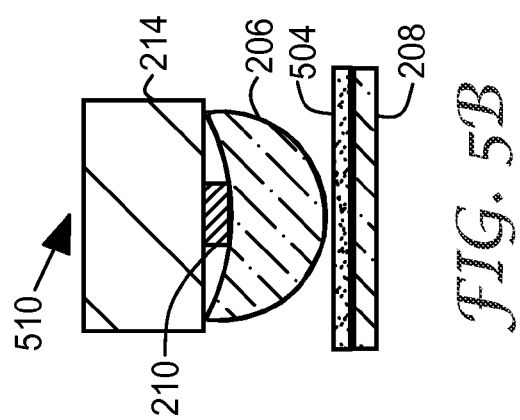
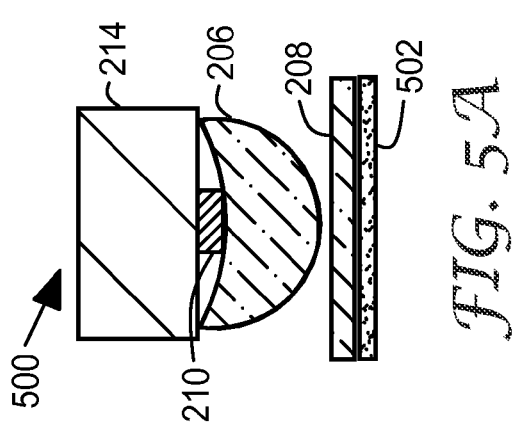

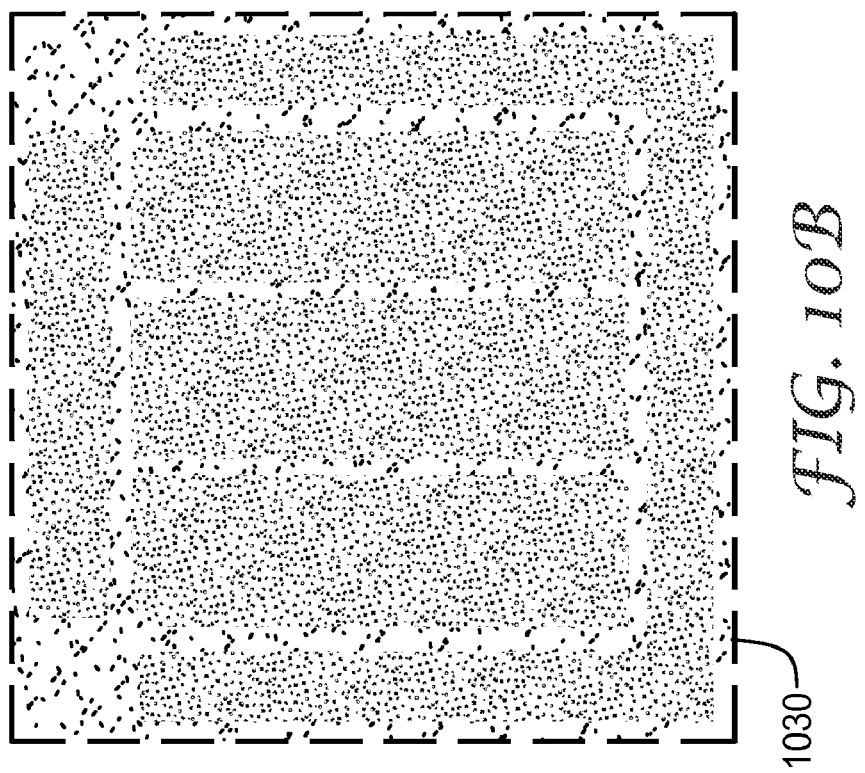
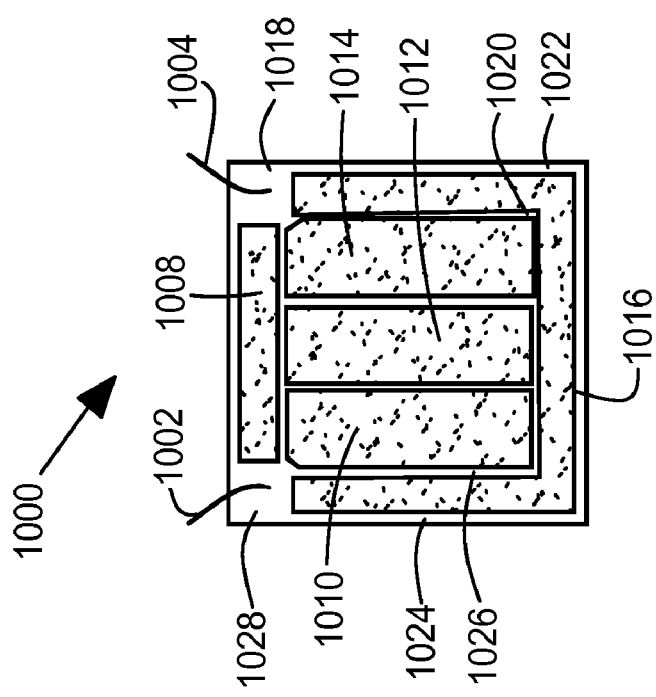

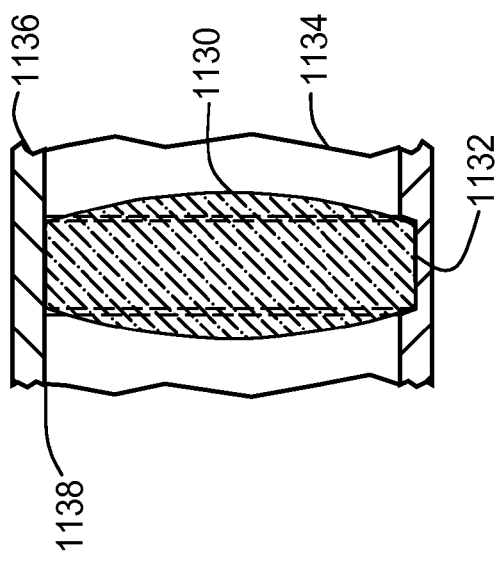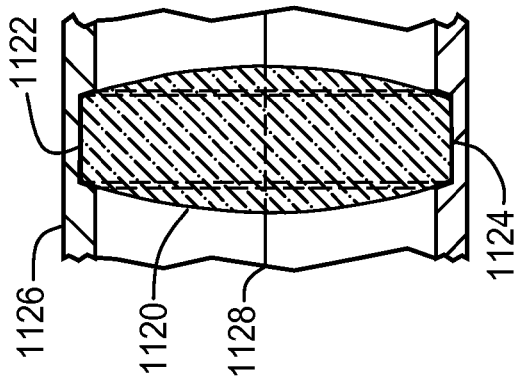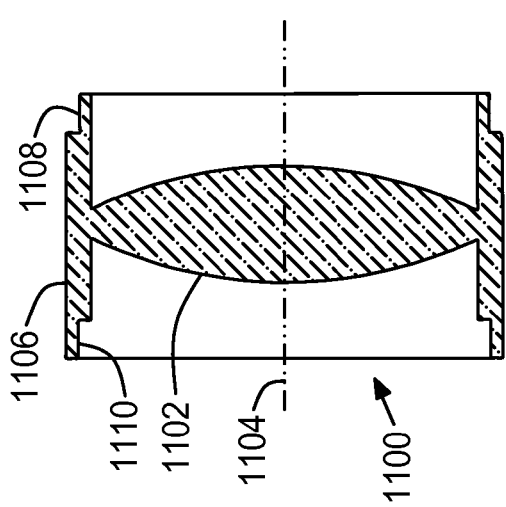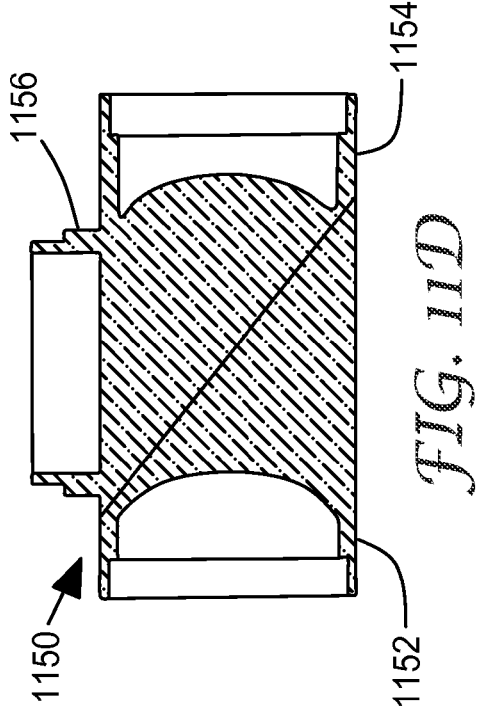

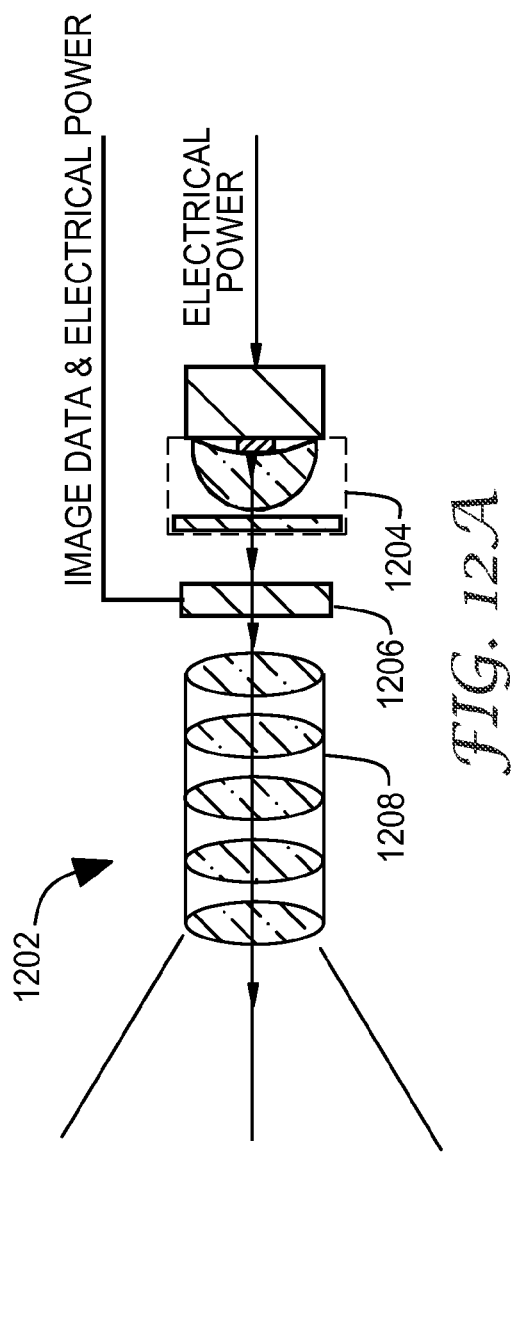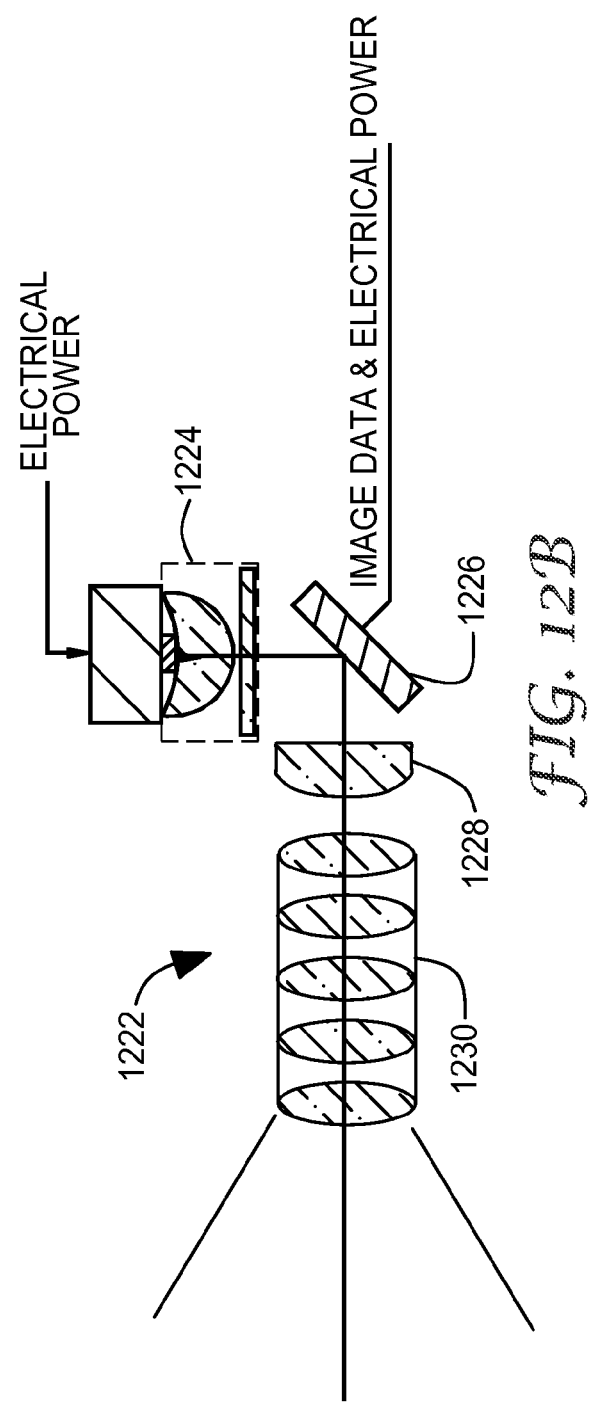

OPTICAL PROJECTION SUBSYSTEM

CROSS-REFERENCE TO RELATED APPLICATIONS

This application is a continuation of U.S. application Ser. No. 11/831,307 filed Jul. 31, 2007 now U.S. Pat. No. 7,901,083, now allowed, which is based on and claims the benefit of U.S. provisional patent application Ser. No. 60/820,894, filed Jul. 31, 2006 the content of which is hereby incorporated by reference in its entirety; Ser. No. 60/820,887, filed Jul. 31, 2006 the content of which is hereby incorporated by reference in its entirety; Ser. No. 60/820,888, filed Jul. 31, 2006 the content of which is hereby incorporated by reference in its entirety; Ser. No. 60/820,883, filed Jul. 31, 2006 the content of which is hereby incorporated by reference in its entirety; Ser. No. 60/821,032, filed Aug. 1, 2006 the content of which is hereby incorporated by reference in its entirety; and Ser. No. 60/838,988, filed Aug. 21, 2006 the content of which is hereby incorporated by reference in its entirety; and Ser. No. 11/772,609, filed Jul. 2, 2007 the content of which is hereby incorporated by reference in its entirety.

BACKGROUND

Optical projectors are used to project images onto surfaces for viewing by groups of people. Optical projectors include optical projector subsystems that include lenses, filters, polarizers, light sources, image forming devices and the like. Fixed front and rear electronic projectors are known for use in education, home theatres and business meeting use. Known light sources include black body lamps, gas discharge lamps, and solid state sources such as lasers, light emitting diodes (LED's) and organic light emitting diodes (OLED's). Head mounted displays (HMD's) are known for individual use. For mobile applications, there is a desire to miniaturize optical projectors both in terms of volume and thickness and make them extremely power efficient while maintaining low power consumption, low cost and high image quality. However, the large dimensions and high power consumption of existing optical projection subsystems limit efforts to create a truly portable projector. A method and optical projection subsystem are needed that provide both miniaturization and efficiency to project good quality images in a cost effective manner.

SUMMARY

Disclosed is a projection subsystem. The projection subsystem comprises an illumination subsystem that provides an incoherent, homogenized light beam. The illumination subsystem includes a collection lens, a collimator and at least one solid state light emitter. The solid state light emitter receives an electrical power level and is couplable to a heat sink.

The projection subsystem includes an image-forming device. The image forming device receives image data and the polarized beam. The image-forming device provides an image to the refractive body.

The projection subsystem comprises a projection lens assembly. The projection lens assembly receives the image from the refractive body and provides an image projection beam having a luminous flux level.

According to one aspect, the projection subsystem has a portability efficacy that comprises a volume of less than 14 cubic centimeters and a thickness of less than 14 millimeters.

BRIEF DESCRIPTION OF THE DRAWINGS

FIGS. 5A, 5B illustrate portions of projection subsystems that include blue blocking filters.

FIGS. 5C, 5D illustrate portions of projection subsystems that include polarization filters that change image contrast.

FIG. 10A illustrates a light emitting diode.

FIG. 10B illustrates an image formed from light emitted by the light emitting diode of FIG. 10A through an optical system.

FIG. 11A, 11B, 11C, 11D illustrate examples of mounting an optical component in a projection subsystem.

FIGS. 12A, 12B illustrate alternative embodiments of projection subsystems.

DETAILED DESCRIPTION

For mobile applications it is desirable to project images of diagonal size 12 cm or more, under ambient lighting conditions, which would generally require at least 3 lumens flux and at least 30:1 contrast ratio for good viewability. Additional desired features to provide good image quality can include a large number of resolvable pixels, wide color gamut, and image uniformity.

Figure 1:
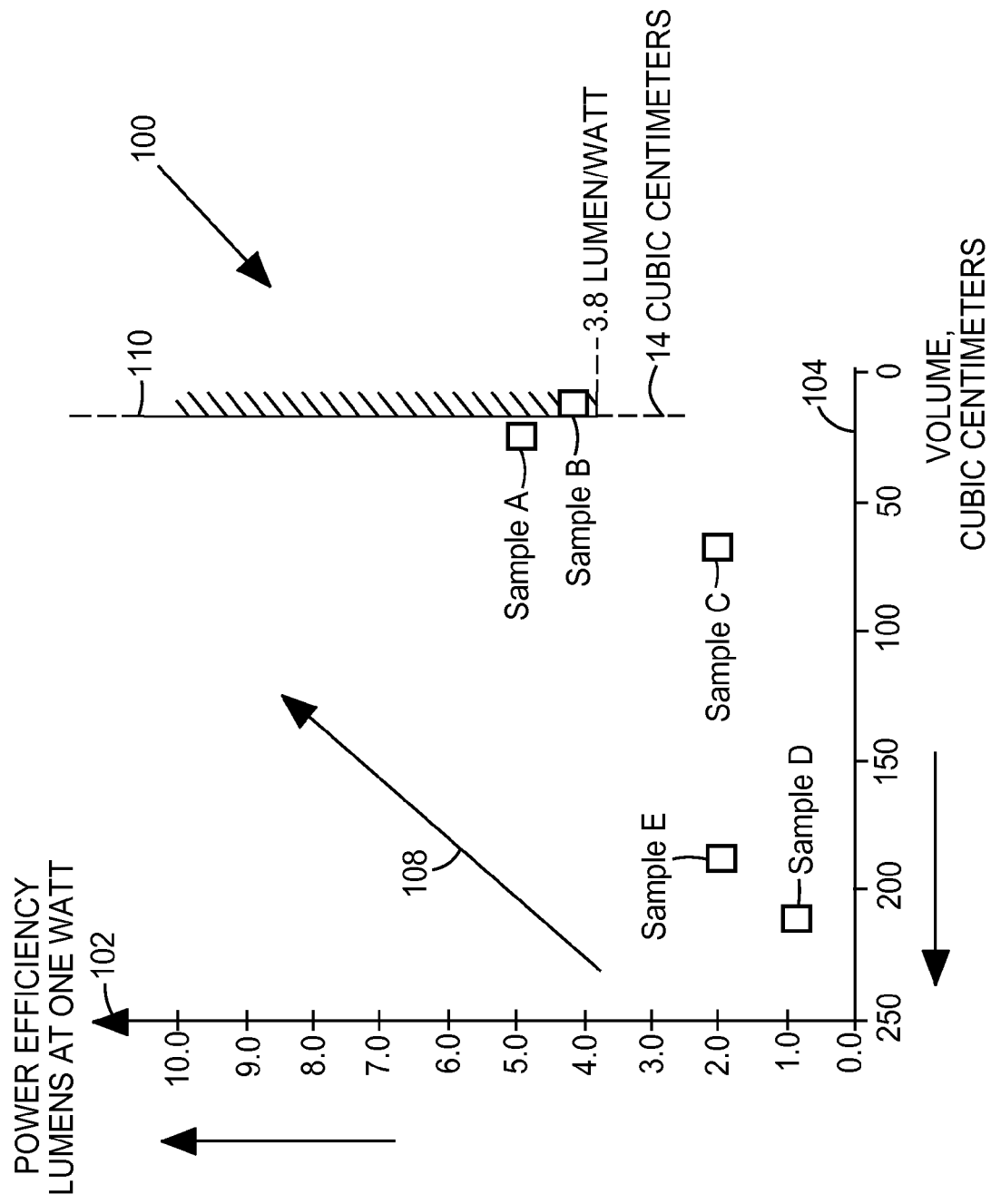
FIG. 1 is a graph 100 that illustrates a qualitative measure of portability efficacy for projection subsystems.

For mobile applications "portability efficacy" will be defined as a combined measure of the small size, high power efficiency and luminous output of the projection subsystem. FIG. 1 is a graph 100 that illustrates two aspects of portability efficacy for projection subsystems. The term "projection subsystem" refers to a light source, image forming device and associated refractive or reflective optical components such as lenses, mirrors, or beam splitters that are used to provide a projected optical image. A vertical axis 102 represents power efficiency of a projection subsystem in lumens for 1 watt of electrical power applied to the light source. A horizontal axis 104 represents a volume of a projection subsystem. Portability efficacy 108 increases as the efficiency increases, and increases as the volume decreases. Projection subsystems have increased portability when power efficiency is higher and the volume is smaller.

Desired features for projection subsystems include a high level of optical flux in the projected image, large screen size, high contrast, large pixel content, and a wide color gamut. FIG. 1 illustrates one way of comparing some of these features for different optical systems. As described in the presently disclosed embodiments, projection subsystems with incoherent light sources are able to provide useful combinations of the desired features.

As illustrated in FIG. 1, representative conventional projection subsystems A, C, D, and E are evaluated for power efficiency and size and mapped onto the graph 100. Subsystems A and C are generally superior to D and E in power efficiency and size, but they use coherent laser light sources that have drawbacks in terms of high cost, low image quality from laser speckle, and potential eye safety issues, particularly under electrical or mechanical fault conditions. Subsystems D and E use incoherent LED light sources, which may overcome the drawbacks of laser-based systems, but they are relatively large, low in power efficiency or both, leading to limited portability efficacy. The exemplary projection subsystem of the present invention is represented on graph 100 as projection subsystem B, which uses an incoherent light source and has smaller size and greater efficiency than subsystems D and E.

Ambient lighting levels in projection environments do not scale down when a projector design is miniaturized or scaled down. A sufficient projection light power level is desired in order to provide a projection image that is bright enough for a group of viewers in the presence of ambient light. If the size of a light emitting source were to be miniaturized, for example, and the same electrical power level were to be applied to the smaller light emitting source, increased temperature rises would be encountered in the smaller light emitting source that could cause overheating. There is a need to optimize the optical efficiency of the projector optics in order to scale down electrical power level to avoid overheating the small light emitting source without reducing the luminous flux of the projected image output. While high power solid state lasers that can efficiently produce highly collimated, coherent light might improve power efficiency, the use of coherent light may produce speckle, decreasing projected image quality. Also, the use of laser light raises concerns about eye safety, particularly under electrical or mechanical fault conditions.

As illustrated in the embodiments described below, optical components are assembled in improved combinations to reach desired high levels of luminous flux with low levels of electrical power in a miniature projection subsystem. The use of coherent light sources is avoided. The portability efficacy of the projection subsystem is enhanced. In particular, many optical losses that typically occur when light passes through air between conventional projector optics components are avoided.

Projection subsystems disclosed herein are capable of operation in a region 110 in graph 100 which has high portability efficacy. The region 110 is limited to a volume of no more than 14 cubic centimeters and an efficiency of no less than 3.8 lumens for 1 watt.

Another measure of portability efficacy comprises a thickness of an projection subsystem along its thinnest axis. An projection subsystem is best suited for use in a pocket portable device when the projection subsystem has a thickness of less than 14 millimeters along a thickness axis. Another aspect of portability efficacy is luminous flux. An projection subsystem is best suited for use in a pocket portable device when the luminous flux is at least 3 lumens.

Figure 2:
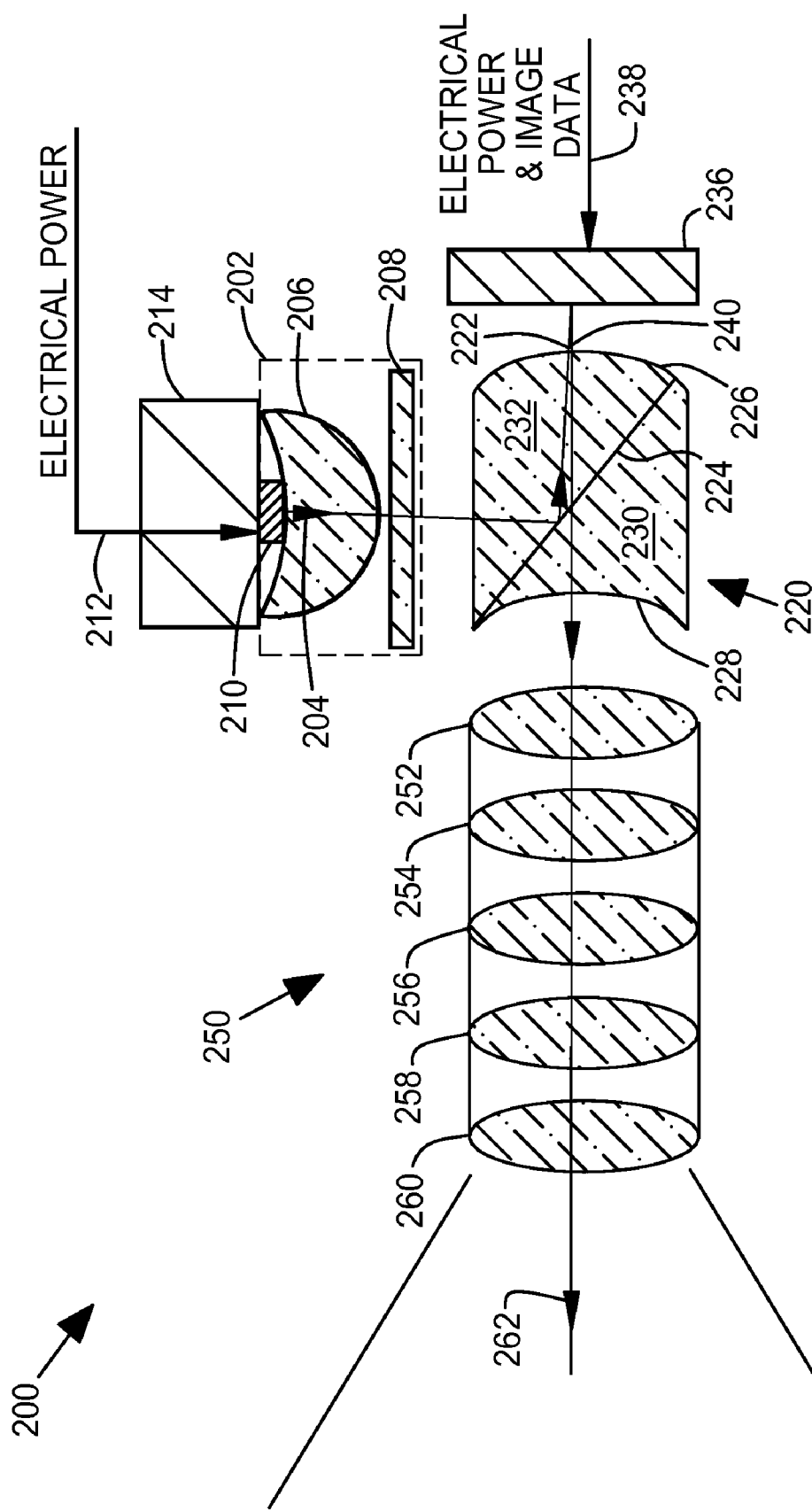
FIG. 2 illustrates a projection subsystem.

FIG. 2 illustrates a projection subsystem 200. The projection subsystem 200 is useful for projecting still or video images from miniature electronic systems such as cell phones, personal digital assistants (PDA's), global positioning system (GPS) receivers. Projection subsystem 200 receives electrical power and image data from the miniature electronic system (not illustrated in FIG. 2) into which it is embedded. Projection subsystem 200 is useful as a component part of a miniature projector accessory for displaying computer video. Projection subsystem 200 is useful in systems that are small enough to be carried, when not in use, in a pocket of clothing, such as a shirt pocket. Images projected by the projection subsystem 200 can be projected onto a reflective projection screen, a light-colored painted wall, a whiteboard or sheet of paper or other known projection surfaces. Projection subsystem 200 can be embedded, for example, in a portable computer such as a laptop computer or a cell phone.

Projection subsystem 200 comprises a light engine 202. The light engine 202 provides a light beam 204. The light engine includes a collection lens 206, a collimator 208 and a solid state light emitter 210. According to one aspect, the collection lens 206 comprises a hyperhemispheric ball lens. According to one aspect, the hyperhemispheric ball lens is arranged as taught in US Patent Publication US 2007/0152231, the contents of which are hereby incorporated by reference.

The solid state light emitter 210 receives electrical power 212 with an electrical power level. The solid state emitter 210 thermally couples to a heat sink 214. The solid state light emitter provides an emitter light beam with an emitter luminous flux level. According to one aspect, the light beam 204 comprises incoherent light. According to another aspect the light beam 204 comprises illumination that is a partially focussed image of the solid state light emitter 210. According to yet another aspect the solid state light emitter 210 comprises one or more light emitting diodes (LED's). According to another aspect, the collection lens 206 comprises a hemispheric ball lens. According to another aspect, the collimator 208 comprises a focusing unit comprising a first fresnel lens having a first non-faceted side for receiving a first non-collimated beam and a first faceted side for emitting the collimated beam; and a second fresnel lens having a second non faceted side for substantially directly receiving the collimated beam and second faceted side for emitting an output beam. According to another aspect the solid state light emitter 210 can be arranged as shown in U.S. Provisional Application 60/820,883. According to another aspect the light engine 202 can be arranged as shown in U.S. Provisional Applications 60/820,887, 60/820,888, 60/821,032, 60/838,988.

The projection subsystem 200 comprises a refractive body 220. The refractive body 220 receives the light beam 204. The refractive body 220 provides a polarized beam 222. The refractive body 220 includes an internal polarizing filter 224. One polarized component of the light beam 204 is reflected by the internal polarizing filter 224 to form the polarized beam 222. According to one aspect, the refractive body is formed or utilized according to one or more aspects of US Patent Publication US 2007/0023941 A1 Duncan et al., US Patent Publication US 2007/0024981 A1 Duncan et al., US Patent Publication US 2007/0085973 A1 Duncan et al., and US Patent Publication US 2007/0030456 Duncan et al., all of which are hereby incorporated by reference in their entirety. The refractive body 220 comprises a first external lens surface 226 and a second external lens surface 228. According to one aspect, the external lens surfaces 226, 228 have curved lens surfaces and have non-zero lens power. According to another aspect, the external lens surface 226 comprises a convex lens surface that is useful in maintaining a small volume for the projection subsystem 200. According to another aspect, the external lens surfaces 226, 228 are flat. According to one aspect, the refractive body 220 comprises plastic resin material bodies 230, 232 on opposite sides of the internal polarizing filter 224. According to another aspect, the internal polarizing filter 224 comprises a multilayer optical film. According to another aspect, the refractive body 220 comprises a multifunction optical component that functions as a polarizing beam splitter as well as a lens. By combining the polarizing beam splitter and lens functions in a multifunction refractive body, losses that would otherwise occur at air interfaces between separate beam splitters and lenses are avoided.

The projection subsystem 200 comprises an image-forming device 236. The image-forming device 236 receives image data on electrical input bus 238. The image-forming device 236 receives the polarized beam 222. The image-forming device 236 selectively reflects the polarized beam 222 according to the image data. The image-forming device 236 provides an image 240 with a polarization that is rotated relative to the polarization of the polarized beam 222. The image-forming device 236 provides the image 240 to the refractive body 220. The image 240 passes through the internal polarizing filter 224. According to one aspect, the image-forming device 236 comprises a liquid crystal on silicon (LCOS) device.

The projection subsystem 200 comprises a projection lens assembly 250. The projection lens assembly 250 comprises multiple lenses indicated schematically at 252, 254, 256, 258, 260. The projection lens assembly 250 receives the image 240 from the refractive body 220. The projection lens assembly 250 provides an image projection beam 262 having a projected luminous flux that is suitable for viewing. According to one aspect the projected luminous flux is no less than 3 lumens. According to another aspect, a ratio of the projected luminous flux to the electrical power level is at least 3.8 lumens for 1 watt. According to another aspect, the ratio of the projected luminous flux to electrical power level is at least 7 lumens per watt. According to another aspect, the ratio of projected luminous flux to electrical power level is at least 10 lumens per watt. According to another aspect, the collection efficiency ratio is at least 38.5%. The collection efficiency ratio is defined as a ratio of the polarized luminous flux impinging on an active surface of the image forming device 236 to the luminous flux emitted from the unpolarized solid state light emitter 210.

According to another aspect, the projection subsystem 200 has an electrical power level of no more than 3.6 watts. According to another aspect, the projection subsystem 200 has a volume of less than 14 cubic centimeters. According to another aspect, the projection subsystem 200 has a thickness of less than 14 millimeters.

According to another aspect, the projection subsystem 200 has an F number that is less than 2.4. According to another aspect, the projection subsystem has an ANSI contrast ratio of at least 30:1. According to another aspect, the projection subsystem has an ANSI contrast ratio of at least 50:1. According to another aspect, the projection subsystem has an on/off contrast ratio of at least 100:1.

Figure 3B:
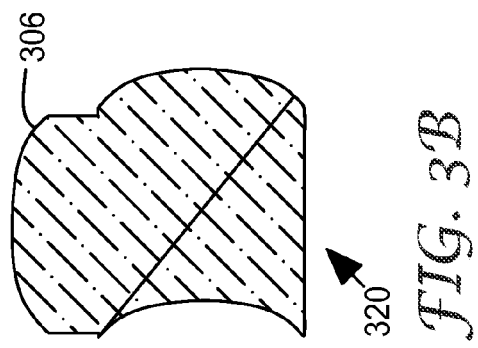
FIG. 3B illustrates a projection subsystem that includes an anamorphic surface on a refractive body.
Figure 3A:
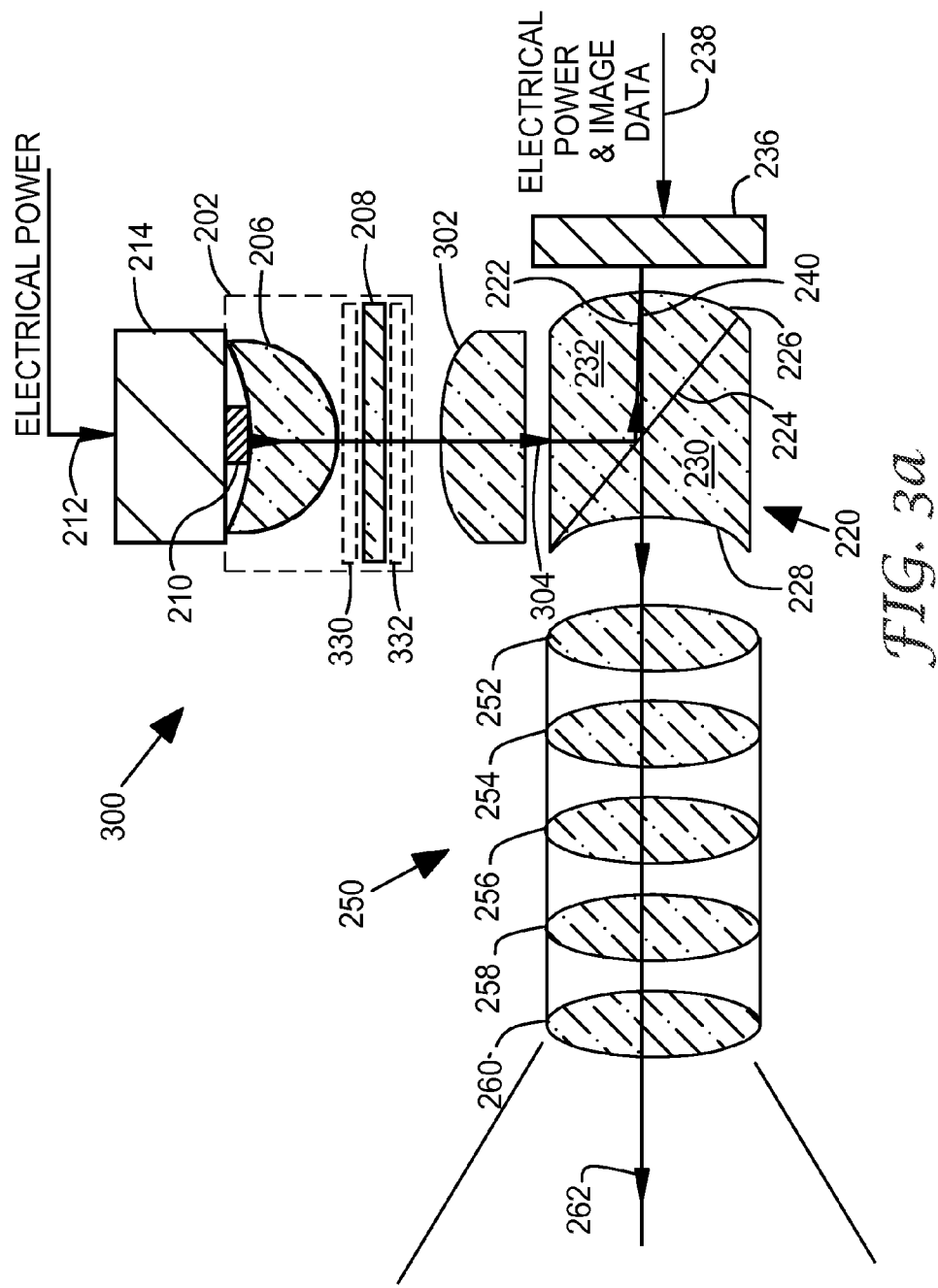
FIG. 3A illustrates a projection subsystem that includes an anamorphic optical device.

FIG. 3A illustrates a projection subsystem 300. Projection subsystem 300 is similar to projection subsystem 200 except that an anamorphic optical device 302 is included in the projection subsystem 300. Reference numbers used in FIG. 3A that are the same as reference number used in FIG. 2 represent the same or similar features. In other respects, the projection subsystem 300 is similar to projection subsystem 200. The anamorphic optical device 302 alters an aspect ratio of a light beam 304. The anamorphic optic device 302 changes light beam shape to adapt a first aspect ratio in the light engine 202 to a second different aspect ratio in the refractive body 220. According to one aspect, the first aspect ratio is 1:1 and the second aspect ratio is 16:9. According to another aspect the first aspect ratio is 1:1 and the second aspect ratio is 4:3. According to one aspect, the second aspect ratio matches an aspect ratio of the image forming device 236. According to one aspect the anamorphic optical device 302 comprises an anamorphic lens as illustrated in FIG. 3A. According to another aspect illustrated in FIG. 3B, an anamorphic surface 306 provided on a refractive body 320 serves as an anamorphic optical device. In other respects the refractive body 320 is similar to the refractive body 220 in FIG. 3A.

According to another aspect, a polarization filter can be positioned at locations 330 or 332 in FIG. 3A. The polarization filter at location 330 or 332 enhances optical contrast ratio of the optical subsystem 300. According to one aspect, the polarization filter positioned at locations 330, 332 comprises a multilayer optical film.

Figure 4:
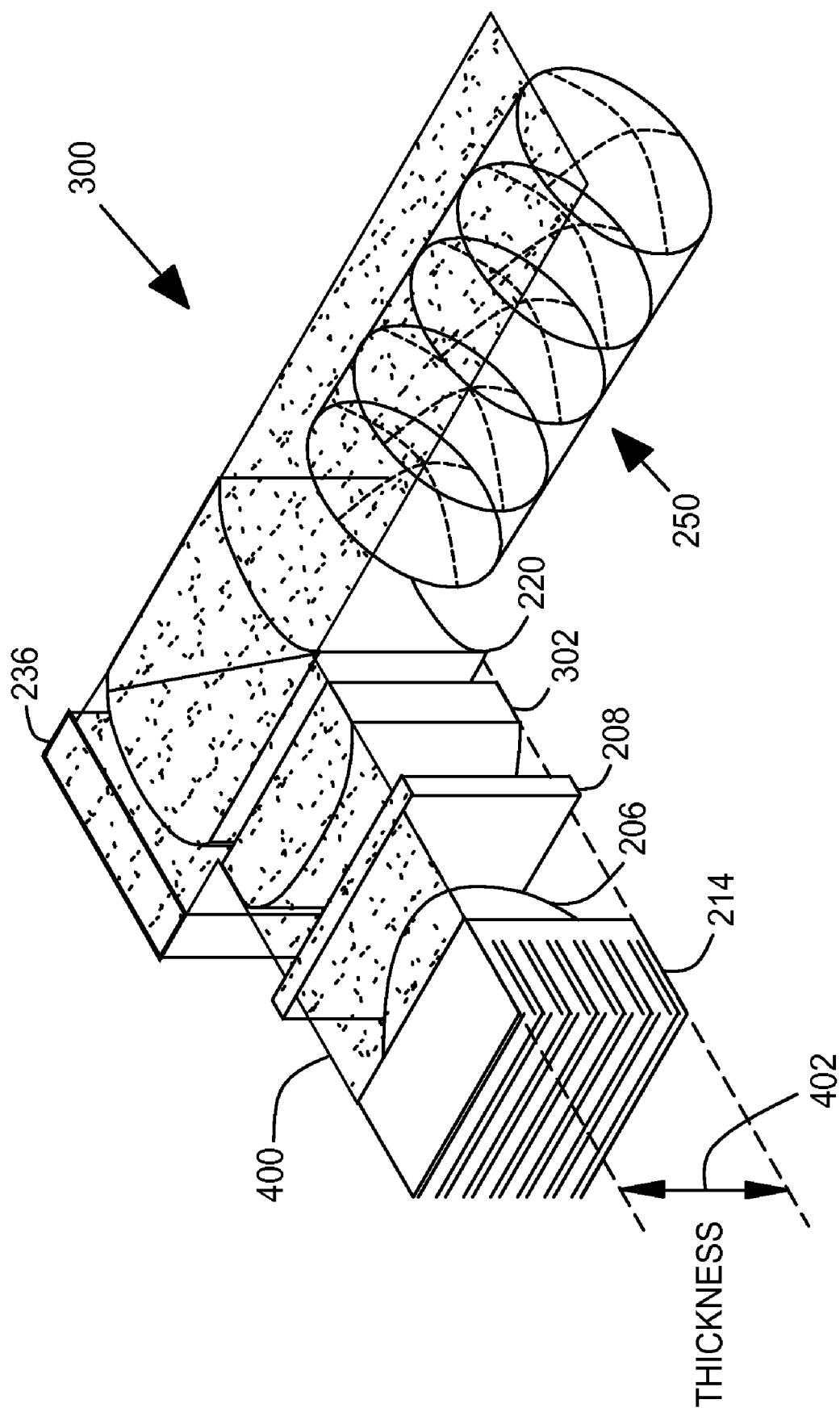
FIG. 4 illustrates an oblique view of the projection subsystem of FIG. 3A.

FIG. 4 illustrates an oblique view of the projection subsystem 300 of FIG. 3. The projection subsystem 300 has a thickness 402. The projection subsystem 300 has a cross-sectional area 400 which is indicated by a stippled planar surface that is perpendicular to the thickness 402. The cross-sectional area 400 includes the areas of components 206, 208, 236, 220, 250, 302 and intervening air spaces between the components which carry useful light. The projection subsystem 300 has a volume that is a mathematical product of the thickness 402 and the cross-sectional area 400.

FIGS. 5A, 5B illustrate portions of projection subsystem 500, 510 that are similar to projection subsystem 200 or 300. Projection subsystem 500 includes a filter 502. The filter 502 is adjacent the collimator 208. According to one aspect, the filter 502 comprises an optical component that is separate from the collimator 208. According to another aspect, the filter 502 comprises a filter layer on the collimator 208. According to one aspect, the collimator 208 is between the filter 502 and the lens 206 as illustrated in FIG. 5A. According to another aspect illustrated in FIG. 5B, a filter 504 is between the collimator 208 and the lens 206. The filters 502, 504 comprise a blue blocking filter that also blocks ultraviolet (UV) radiation. The blue blocking filter blocks blue and ultraviolet light at wavelengths which tend to deteriorate refractive optical devices, while passing the portion of the blue spectrum desired to be present in the projected image. The filter 502 or 504 blocks undesired light from reaching the refractive body 220.

FIGS. 5C, 5D illustrate portions of projection subsystem 520, 540 that are similar to projection subsystem 200 or 300. Projection subsystem 520 includes a filter 522. The filter 522 is positioned between the refractive body 220 and the projection lens assembly 250. Projection subsystem 540 includes a refractive body 220A that includes a filter 542 adjacent a polarizing filter 224. The filter 542 is positioned between the polarizing filter 224 and a plastic resin body 230. The filters 522, 542 comprise polarizing filters. The polarizing filters 522, 542 increase the contrast of the projected image. According to one aspect, a projection subsystem according to FIG. 5D is described in US Patent Application titled "Polarizing Beam Splitters Incorporating Reflective and Absorptive Polarizers and Image Display Systems Thereof," identified as application Ser. No. 11/457,599.

Figure 6:
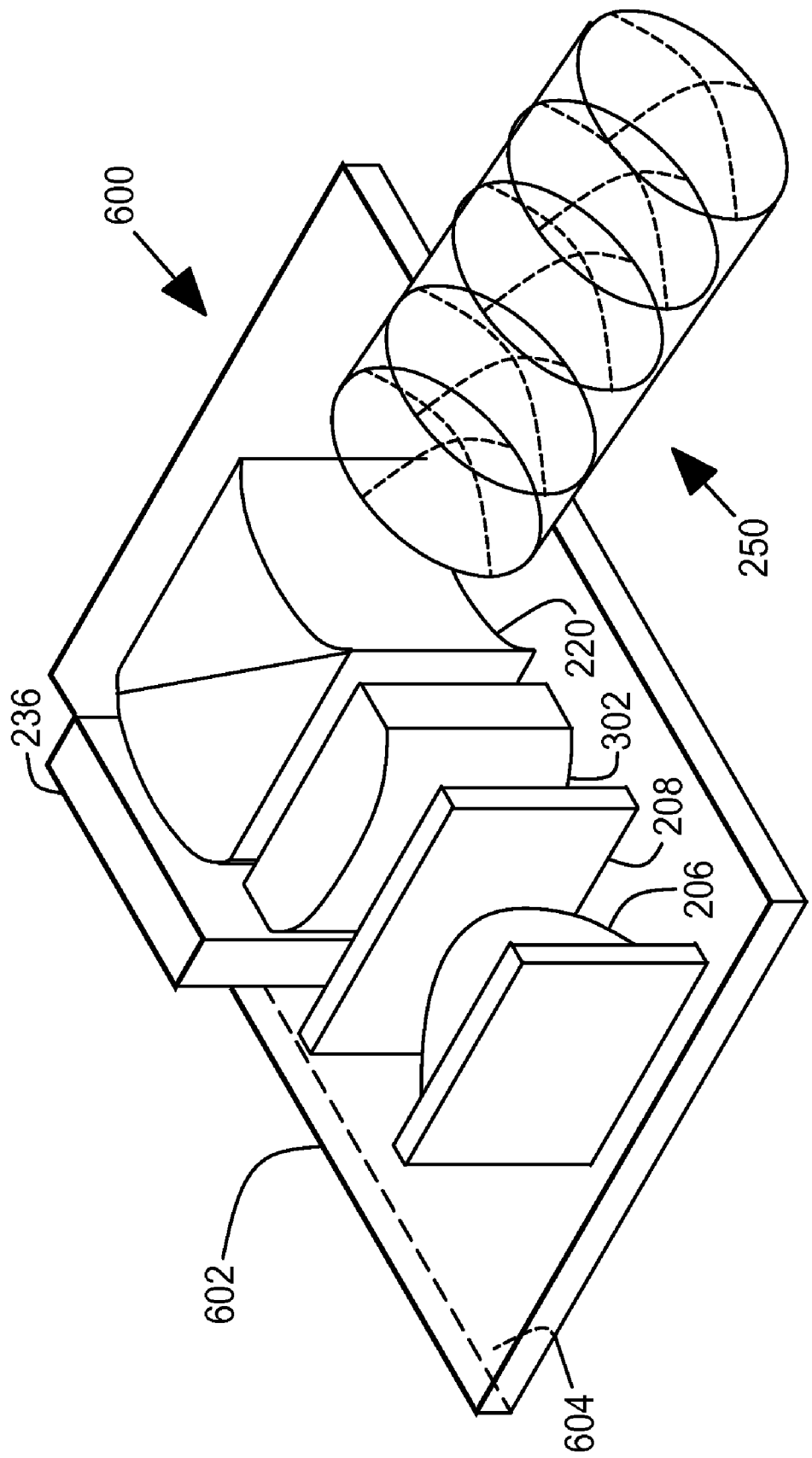
FIG. 6 illustrates a projection subsystem that has a plate heat sink.

FIG. 6 illustrates a projection subsystem 600 that is similar to projection subsystem 300 in FIG. 4 except that projection subsystem 600 comprises a plate heat sink 602 whereas projection subsystem 300 in FIG. 4 comprises a heat sink 214 that has protrusions such as fins or pins. In other respects, projection subsystem 600 is similar to projection subsystem 300. According to one aspect, the plate heat sink 602 has a lower plate surface 604 that is exposed at an outer package surface of a pocket portable electronic package such as a cell phone, personal digital assistant (PDA), global positioning system (GPS) or similar pocket device. According to another aspect, the plate heat sink 602 makes thermal contact to other elements in the electronic device to dissipate the heat.

According to another aspect, during use, the lower plate surface 604 can be place in contact with an accessory external heat sink for extended use.

Figure 7:
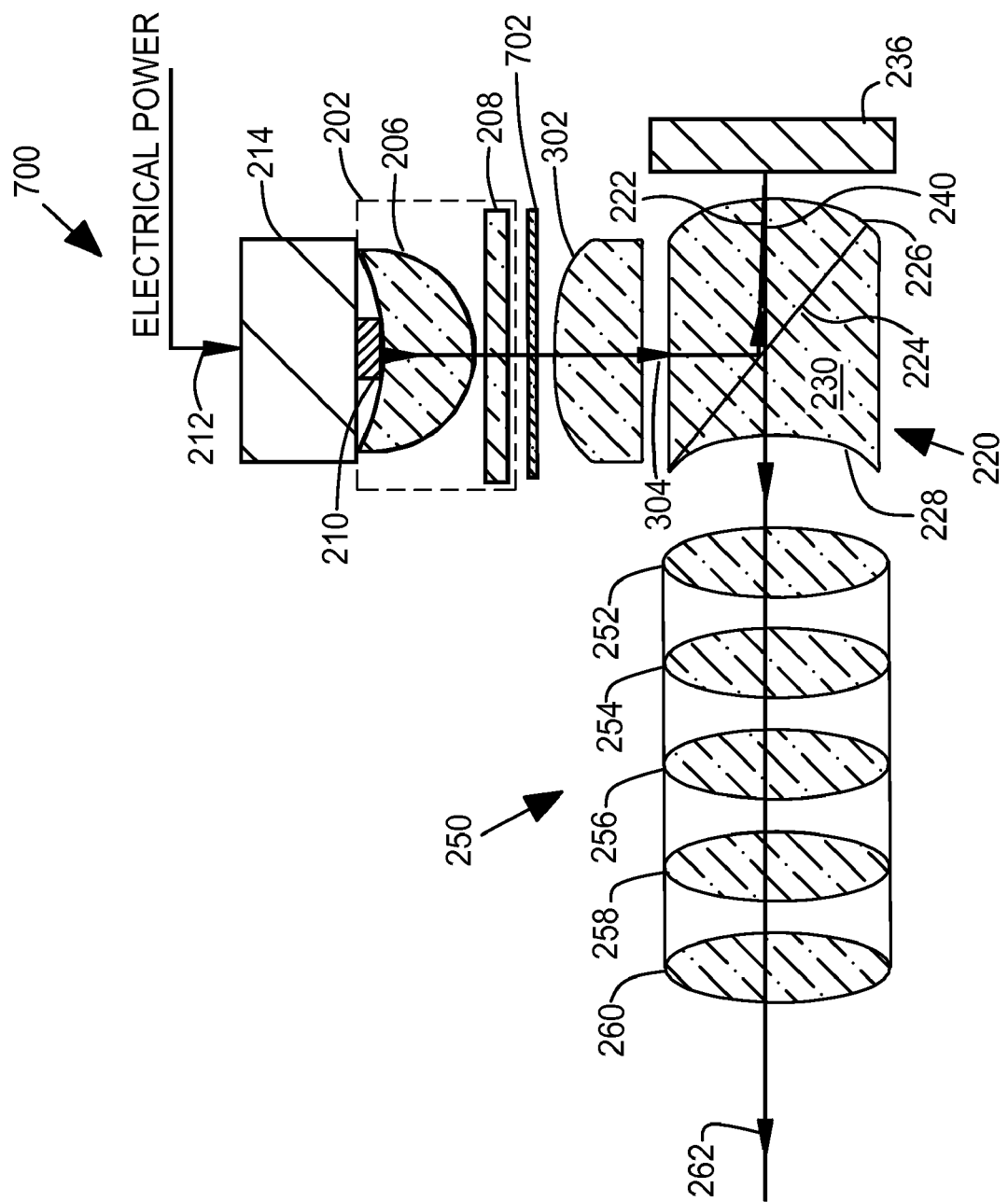
FIG. 7 illustrates a projection subsystem that includes light recycling.

FIG. 7 illustrates a projection subsystem 700 that is similar to the projection subsystem 300 in FIG. 3A, except that the projection subsystem 700 includes a polarization film 702 disposed along an optical path between the collection lens 206 and the refractive body 220. According to one aspect, the polarization film 702 is disposed between a collimator 208 and the refractive body 220 as illustrated in FIG. 7. The polarization film 702 reflects polarized light back toward the reflective surface of a solid state light emitter 210 to provide light recycling. Inclusion of the polarization film 702 increases the luminous flux of the projection subsystem. According to one aspect, polarization recycling is as described in U.S. patent application Ser. No. 11/772,609 filed Jul. 2, 2007, the content of which is hereby incorporated by reference in its entirety.

Figure 8:
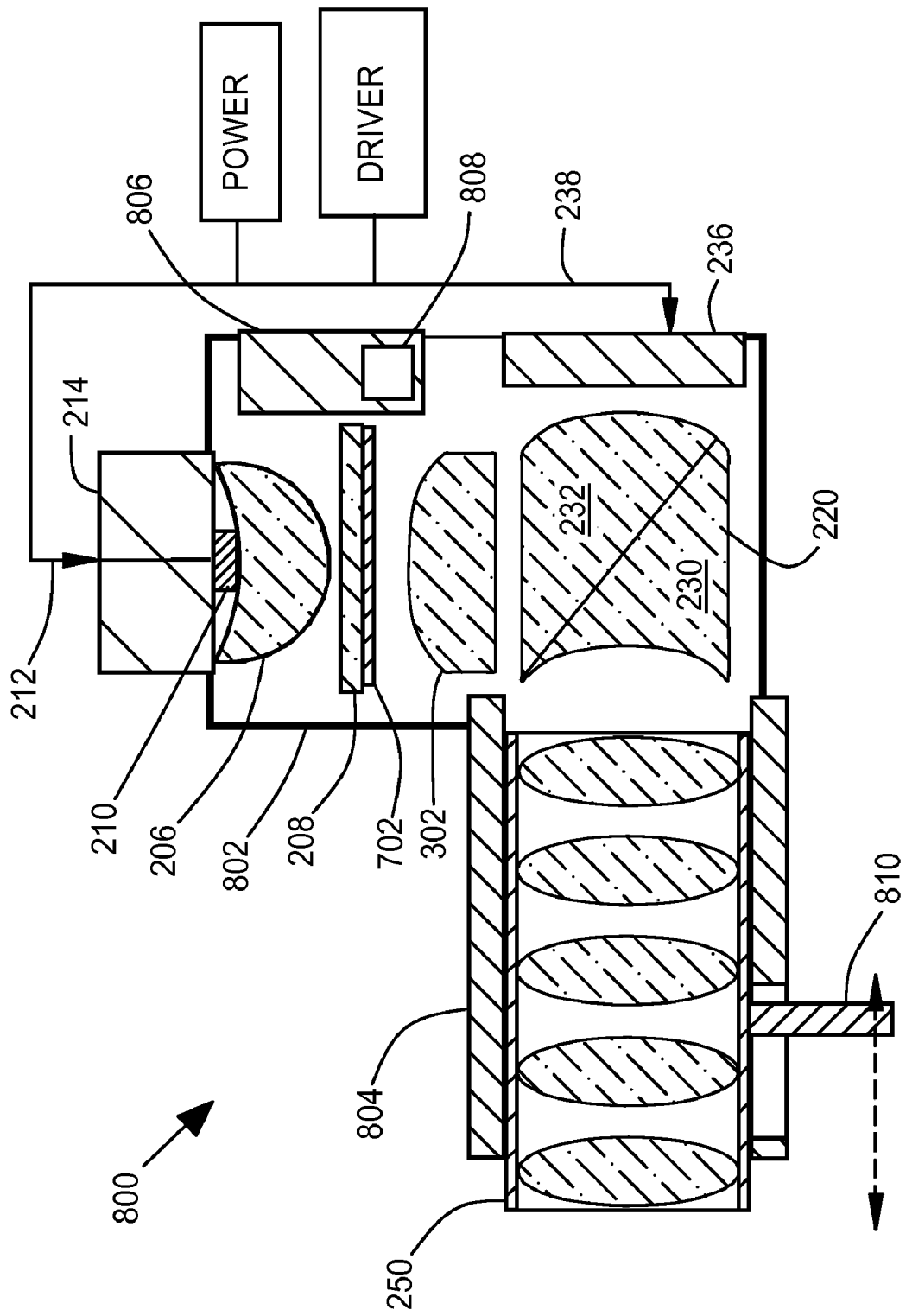
FIG. 8 illustrates a projection subsystem that includes an enclosure.

FIG. 8 illustrates a projection subsystem 800 that is similar to the projection subsystems of FIGS. 3A, 7. The projection subsystem 800 includes an enclosure 802 that encloses at least portions of the optical components 206, 208, 702, 302, 220 and protects optical component surfaces from contamination and moisture. According to one aspect, the enclosure 802 may include an air filter 806. The air filter 806 restricts flow of air, filters out contamination and equalizes pressure between an interior of the enclosure 802 and the surrounding atmosphere. According to one aspect, the air filter 806 includes a dessicant 808 that reduces humidity inside the enclosure 802. According to another aspect, the enclosure 802 serves a mechanical mounting for optical components.

The enclosure 802 is coupled to a lens assembly guide tube 804. A projection lens assembly 250 is slidably mounted in the guide tube 804. The projection lens assembly 250 includes an actuation lever 810 that can be mechanically actuated to move the position of the projection lens assembly 250 relative to the image forming device 236. The movement of the projection lens assembly 250 comprises a focus adjustment. According to one aspect, the projection lens assembly 250 fits closely in the guide tube 804 to provide a seal that prevents entry of contamination into the enclosure 802. According to another aspect, one or more O-rings (not illustrated) are provided between the projection lens assembly and the guide tube 804 to provide a seal. According to yet another aspect, a bellows (not illustrated) is provided between an end of the projection lens assembly 250 and the guide tube 804 to provide a seal.

Figure 9:
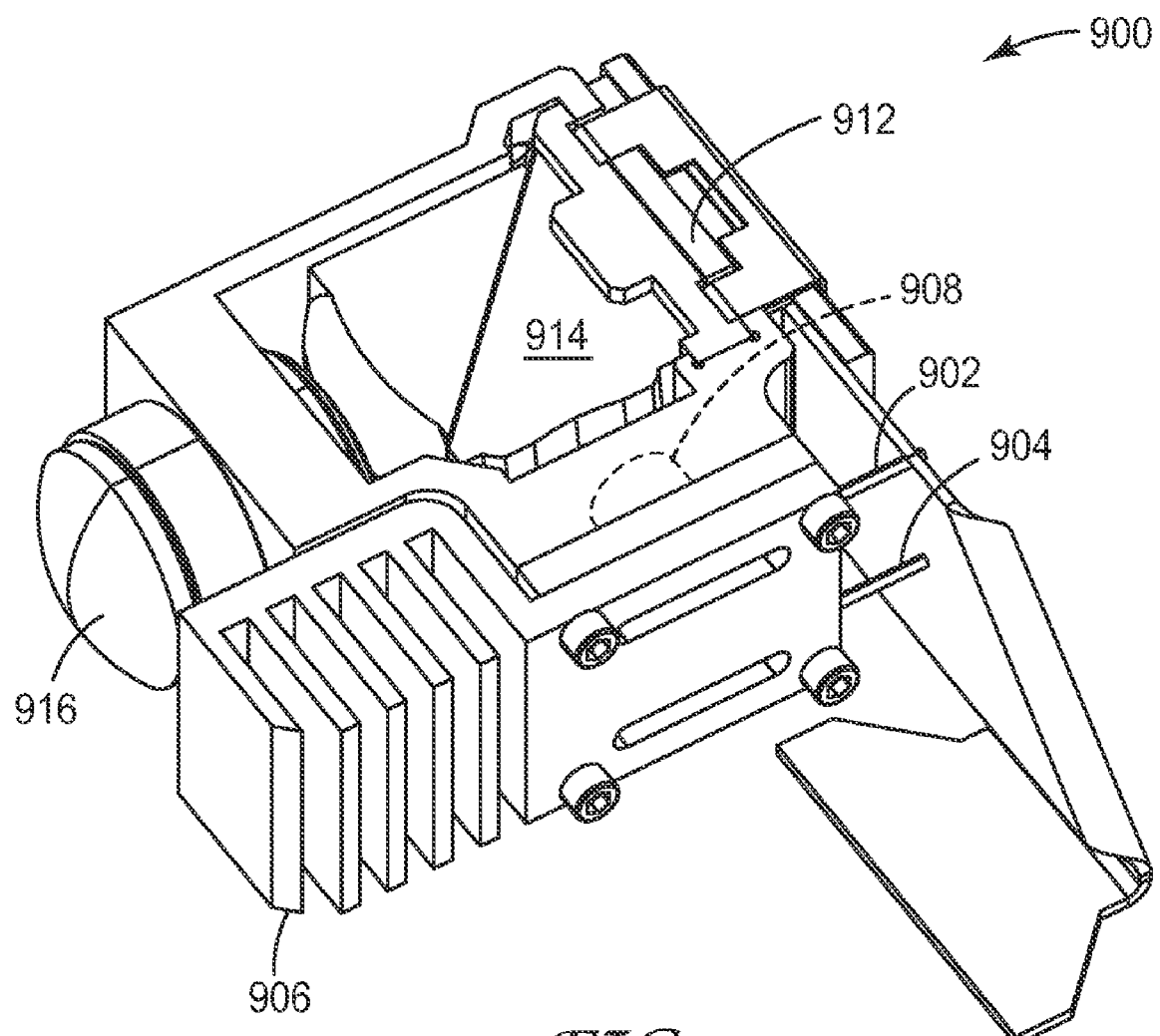
FIG. 9 illustrates an oblique view of a projection subsystem.

FIG. 9 illustrates an oblique view of a projection subsystem 900 that is similar to the projection subsystem shown in FIG. 2. The projection subsystem 900 comprises a solid state light emitter (not visible in FIG. 9) that is connected by electrical leads 902, 904 to a source of electrical power. The solid state light emitter is thermally coupled to a heat sink 906. The projection subsystem 900 includes a collection lens 908. The projection subsystem 900 includes an image forming device 912, a refractive body 914 and a projection lens 916.

FIG. 10A illustrates a light emitting diode 1000 that serves as an exemplary solid state light emitter, such as solid state light emitter 210 in FIG. 2. The light emitting diode 1000 is connected to electrical power by way of bond wires 1002, 1004. The light emitting diode 1000 includes light emitting regions 1008, 1010, 1012, 1014, 1016. Other regions of the light emitting diode 1000, such as regions 1018, 1020, 1022, 1024, 1026, 1028 comprise dark regions that include electrical conductor and that do not generate light. The image of the light emitting diode 1000 is thus a pattern of regions that generate light and regions that do not generate light. For use in projection, an image is desired that is relatively uniform in brightness such as image 1030 illustrated in FIG. 10B. According to one aspect, providing the uniform brightness is as taught in US Patent Publication 2007/0153397 titled "PROJECTION SYSTEM WITH BEAM HOMOGENIZER."

FIG. 11A illustrates an example of mounting an optical component in a projection subsystem. A molded component 1100 comprises an optical portion 1102 along an optical axis 1104 and a mounting flange portion 1106 that is molded in a unitary structure with the optical portion 1102. Optical portion 1102 comprises a lens, however, any of the optical components of the projection subsystem can be used in place of the lens. The molded component is molded from refractive material such as transparent plastic resin. The mounting flange portion 1106 has rims 1108, 1110 that are shaped to mate with flanges of adjacent molded components. Rims can be attached to one another by friction fit, snap fit, gluing, threads or other known attachment methods for plastic resin molded components.

FIG. 11B illustrates an example of mounting an optical component in a projection subsystem. An optical component 1120 is captured in grooves 1122, 1124 of mating halves of a mounting tube 1126. Multiple optical components mount in the mounting tube. The mounting tube 1126 is assembled along a parting line 1128. Optical portion 1120 comprises a lens, however, any of the optical components of the projection subsystem can be similarly mounted in place of the lens.

FIG. 11C illustrates an example of mounting an optical component in a projection subsystem. An optical component 1130 is captured in a groove 1132 of a mounting channel 1134. A lid 1136 is secured to the mounting channel. Multiple optical components mount in the mounting channel 1134. The mounting channel 1134 and the lid 1136 are assembled along a parting line 1138. Optical portion 1130 comprises a lens, however, any of the optical components of the projection subsystem can be similarly mounted in place of the lens.

FIG. 11D illustrates an example of a combination of a refractive body 1150 (such as refractive body 220 of FIG. 2) molded together with mounting flange rims 1152, 1154, 1156 similar to those shown in FIG. 11A.

FIGS. 12A, 12B illustrate alternative embodiments of projection subsystems that have portability efficacy as described above. FIG. 12A illustrates a projection subsystem 1202 that includes a light engine 1204, an image-forming device 1206 and a projection lens assembly 1208. The image-forming device 1206 comprises a transmissive image forming device. FIG. 12B illustrates a projection subsystem 1222 that includes a light engine 1224, an image-forming device 1226, an anamorphic lens 1228 and a projection lens assembly 1230. The image forming device 1226 is a reflective image forming device, such as an array of deflectable mirror pixels, and does not require polarized light for its operation.

EXAMPLE

A projection subsystem is constructed similar to FIGS. 7 and 9, with a refractive body similar to FIG. 3B. The solid state light emitter is a white LED made with a blue InGaN die, part number C450-EZ1000-530000, plus a conformal yellow phosphor, produced by Cree, Inc. (4600 Silicon Drive, Durham, N.C. 27703). The collection lens, and its coupling to the LED, is described in US Patent Publication US 2007/0152231. The collimator is a Fresnel lens having a non-faceted side for receiving the non-collimated beam and a faceted side for emitting the collimated beam. The refractive body is a molded plastic polarizing beam splitter (PBS) as described in US Patent Publication US 2007/0024981. The reflective polarizing films, one within the PBS and one as shown as element 702 in FIG. 7, are manufactured by 3M Company (St. Paul, Minn. 55144) under the trade designation "VIKUITI" advanced polarizing films (APF). The image-forming device is an LCOS microdisplay with internal red, green and blue color filters, part number HX7007ATBFA, produced by Himax Display (2F, No. 26, Zih Lian Road, Tree Valley Park, Sinshih, Tainan County 74445, Taiwan).

Measurements of dimensions and performance are summarized in the following table, in which IEC is an abbreviation for the International Electrotechnical Commission.

| Parameter | Units | Minimum | Typical | Maximum | Measurement Standard | Comments |
|---|---|---|---|---|---|---|
| Resolution | pixels | | 640 × 480 (VGA) | | IEC 61947-1 | |
| Number of colors | number | | 16.8 million | | IEC 61947-1 | Three primaries with 8 bits per primary, $(2^8)^3 =$ 16777216 |
| Aspect Ratio | ratio | | 4:3 | | IEC 61947-1 | |
| Projection distance range | meters | 0.210 | | 1.820 | IEC 61947-1 | |
| Projection distance for 10" image diagonal | meters | | 0.395 | | | |
| Throw ratio range | ratio | 0.600 | | 0.700 | | |
| Throw ratio for 10" image diagonal | ratio | | 0.640 | | | |
| Projection angle @ 10" screen | deg | | 28.5 H × 21.6 V | | | |
| Image size | inches | 5.0 | 10.0 | 50.0 | IEC 61947-1 | |
| Luminous flux at 1 W, 80 C. | lumens | 3.7 | 4.2 | | IEC 61947-1 | For 1 W of LED electrical power, 9 points average. Temperature measured at LED heatsink. |
| Light output uniformity | ratio | −70% | | 40% | IEC 61947-1 | Brightest and dimmest of 13 points relative to 9 point average |
| Contrast Ratio | ratio | 30:1 | 50:1 | | IEC 61947-1 | Broad area (checkerboard) contrast (16 points) |
| On/Off Contrast | ratio | 100:1 | 130:1 | | | Full white, full dark contrast, 9 points |
| Color Gamut | ratio | | 40 | | % of NTSC @ CIE1931 | |
| Correlated Color Temperature | K | 5100 | | 5800 | | |
| White Color Chromaticity | x | | 0.325 | | IEC 61947-1 CIE 1931 | 9 point average |
| | y | | 0.37 | | | 9 point average |
| Red Color Chromaticity | x | | 0.61 | | IEC 61947-1 CIE 1931 | 9 point average |
| | y | | 0.35 | | | 9 point average |
| Green Color Chromaticity | x | | 0.32 | | IEC 61947-1 CIE 1931 | 9 point average |
| | y | | 0.58 | | | 9 point average |

-continued

| Parameter | Units | Minimum | Typical | Maximum | Measurement Standard | Comments |
|---|---|---|---|---|---|---|
| Blue Color Chromaticity | x | | 0.175 | | IEC 61947-1 CIE 1931 | 9 point average |
| | y | | 0.225 | | | 9 point average |
| Length | mm | 37.9 | 38.7 | 43.7 | IEC 61947-1 | Dimension in the direction of the optical axis of the projection lens, for 50", 20" and 5" image sizes on screen |
| Width | mm | | 31.1 | | IEC 61947-1 | Maximum dimension in the direction of the long axis of the imager |
| Thickness | mm | | 12.6 | | IEC 61947-1 | Maximum dimension in the direction of the short axis of the imager |
| Volume | cc | 11.8 | 12.0 | 12.9 | | Volume, as defined in FIG. 4, for 50", 20" and 5" image sizes on screen |

Although the present invention has been described with reference to preferred embodiments, workers skilled in the art will recognize that changes may be made in form and detail without departing from the spirit and scope of the invention.

What is claimed is:

1. A projection subsystem, comprising:
    a light engine that provides a light beam, the light engine including a collection lens, a collimator and at least one solid state incoherent light emitter that receives an electrical power level and that is couplable to a heat sink and that provides a light beam with an emitter luminous flux level;
    an image-forming device that receives image data and that receives at least a component of the light beam, the image-forming device providing an image;
    a projection lens assembly that receives the image and that provides an image projection beam having a projected luminous flux level; and
    the projection subsystem has a portability efficacy that comprises a ratio of luminous flux to electrical power level of at least 3.8 lumens for 1 watt, and a projection subsystem thickness of less than 14 millimeters.

2. The projection subsystem of claim 1 and further comprising:
    a refractive body that includes an internal polarizing filter, the refractive body receiving the light beam and providing a polarized component of the light beam to the image-forming device.

3. The projection subsystem of claim 1, wherein the projection subsystem has an F number of less than 2.4.

4. The projection subsystem of claim 2 and further comprising at least one lens surface that has a non-zero lens power adjacent the image-forming device.

5. The projection subsystem of claim 4 when the lens surface comprises a curved surface of the refractive body.

6. The projection subsystem of claim 2 wherein the portability efficacy comprises a portability efficacy limit selected from the group consisting of: an electrical power that is less than 3.6 watts, a ratio of projected luminous flux level to electrical power level is at least 7 lumens per watt, and a ratio of projected luminous flux level to electrical power level is at least 10 lumens per watt.

7. The projection subsystem of claim 2 and further comprising the heat sink.

8. The projection subsystem of claim 2 wherein the refractive body comprises plastic resin material bodies on opposite sides of the internal polarizing filter.

9. The projection subsystem of claim 2 wherein the internal polarizing filter comprises a multilayer optical film.

10. The projection subsystem of claim 2 further comprising a reflective polarizer disposed adjacent the collimator.

11. The projection subsystem of claim 2 comprising an anamorphic optic surface that adjusts an aspect ratio of the image projection beam.

12. A projection subsystem, comprising:
    a light engine that provides a light beam, the light engine including a collection lens, a collimator and at least one solid state incoherent light emitter that receives an electrical power level and that is couplable to a heat sink and that provides a light beam with an emitter luminous flux level;
    an image-forming device that receives image data and that receives at least a component of the light beam, the image-forming device providing an image;
    a projection lens assembly that receives the image and that provides an image projection beam having a projected luminous flux level; and the projection subsystem has a portability efficacy wherein the electrical power level is less than 3.6 watts, and a projection subsystem thickness is less than 14 millimeters.

13. The projection subsystem of claim 12 wherein the portability efficacy comprises a ratio of the luminous flux level to the electrical power level of at least 3.8 lumens for 1 watt.

14. The projection subsystem of claim 12 wherein the collection lens comprises a hemispheric ball lens.

15. The projection subsystem of claim 12 wherein the light emitting diode source comprises at least one light emitting diode have non-uniform areas of higher and lower light emission, and the partial focusing fills regions of lower light emission to increase uniformity of illumination.

16. The projection subsystem of claim 12 further comprising a reflective polarization light recycler disposed adjacent the collimator.

17. The projection subsystem of claim 12 comprising an anamorphic optic surface that receives the light beam and shapes the light beam to change an aspect ratio of the light beam.

18. A method comprising:
providing a light beam from a light engine that includes a collection lens, a collimator and at least one solid state incoherent light emitter that receives an electrical power level and that is couplable to a heat sink and that provides a light beam with an emitter luminous flux level;
receiving at least a component of the light beam at an image-forming device that receives image data, and providing an image from the image-forming device;
receiving the image at a projection lens assembly and providing an image projection beam having a projected luminous flux level; and
providing a portability efficacy that comprises a ratio of luminous flux to electrical power level of at least 3.8 lumens for 1 watt, and a projection subsystem thickness of less than 14 millimeters.

19. The method of claim 18 and further comprising:
receiving the light beam at a refractive body that includes an internal polarizing filter, the refractive body providing a polarized component of the light beam to the image-forming device.

20. The method of claim 19, further comprising providing the projection subsystem with an F number of 2.4.

21. The method of claim 18 and providing reflective polarization light recycling to provide a collection efficiency ratio of at least 38.5%.

22. The method of claim 18 and providing an anamorphic optic surface adjacent the refractive body, the anamorphic optic surface shaping an aspect ratio of the image beam.

23. The method of claim 18 and providing a focus adjustment that comprises an adjustment of a spacing between the projection lens assembly and the image forming device.

* * * * *

UNITED STATES PATENT AND TRADEMARK OFFICE
CERTIFICATE OF CORRECTION

PATENT NO.         : 8,070,295 B2
APPLICATION NO.    : 13/006079
DATED              : December 6, 2011
INVENTOR(S)        : Patrick Destain et al.

It is certified that error appears in the above-identified patent and that said Letters Patent is hereby corrected as shown below:

Page 3,
Column 2 (Other Publications), line 1, Delete "daliy" and insert -- daily --, therefor.

Column 2 (Other Publications), line 15, Delete ""Ultrahompakte" and insert -- "Ultrakompakte --, therefor.

Column 2,
Line 24, Delete "FIG." and insert -- FIGS. --, therefor.

Column 7,
Line 29, Delete "dessicant" and insert -- desiccant --, therefor.

Column 8,
Line 60, Delete "530000," and insert -- S30000, --, therefor.

Signed and Sealed this
Seventh Day of February, 2012

David J. Kappos
*Director of the United States Patent and Trademark Office*

UNITED STATES PATENT AND TRADEMARK OFFICE
CERTIFICATE OF CORRECTION

PATENT NO. : 8,070,295 B2
APPLICATION NO. : 13/006079
DATED : December 6, 2011
INVENTOR(S) : Patrick Destain et al.

Page 1 of 1

It is certified that error appears in the above-identified patent and that said Letters Patent is hereby corrected as shown below:

Cover Page, Related U.S. Application Data

Item (63), line 2, please delete ", which is a continuation of application No. 11/772,609, filed on Jul. 2, 2007"

Signed and Sealed this
Nineteenth Day of March, 2013

Teresa Stanek Rea
*Acting Director of the United States Patent and Trademark Office*